United States Patent [19]
Schultz et al.

[11] Patent Number: 5,483,146
[45] Date of Patent: Jan. 9, 1996

[54] CONTROL SYSTEM FOR A VEHICLE ELECTRICAL SYSTEM

[75] Inventors: Roy D. Schultz, Dearborn; Robert J. Mohan, Canton; David W. Sirois, Wixom, all of Mich.

[73] Assignee: Ford Motor Company, Dearborn, Mich.

[21] Appl. No.: 189,943

[22] Filed: Feb. 1, 1994

Related U.S. Application Data

[63] Continuation of Ser. No. 960,629, Oct. 14, 1992, abandoned.

[51] Int. Cl.[6] .................................................. H02P 9/04
[52] U.S. Cl. ........................... 322/7; 322/29; 320/61
[58] Field of Search ............................................ 322/7, 61

[56] References Cited

U.S. PATENT DOCUMENTS

| | | | |
|---|---|---|---|
| 3,688,171 | 8/1972 | Salihi et al. | 318/211 |
| 4,044,293 | 8/1977 | Follmer | 320/15 |
| 4,188,527 | 2/1980 | Follmer | 219/202 |
| 4,267,433 | 5/1981 | Sahm, III | 219/203 X |
| 4,277,672 | 7/1981 | Jones | 219/203 X |
| 4,419,618 | 12/1983 | Gretsch | 322/7 |
| 4,423,307 | 12/1983 | Kondo et al. | 219/202 |
| 4,604,528 | 8/1986 | Norton | 307/10 R |
| 4,672,294 | 6/1987 | Norton | 320/17 |
| 4,694,238 | 9/1987 | Norton | 322/28 |
| 4,723,079 | 2/1988 | Norton | 307/66 |
| 4,808,842 | 2/1989 | Hughes | 307/10 R X |
| 4,827,393 | 5/1989 | Clark | 363/79 |
| 4,883,973 | 11/1989 | Lakey et al. | 290/31 |
| 4,949,028 | 8/1990 | Brune | 320/6 |
| 4,950,972 | 8/1990 | Berg | 322/8 |
| 4,973,896 | 11/1990 | Shiga et al. | 322/28 |
| 5,334,926 | 8/1994 | Imaizumi | 320/15 |

Primary Examiner—Steven L. Stephan
Assistant Examiner—Nicholas Ponomarenko
Attorney, Agent, or Firm—Paul K. Godwin; Roger L. May

[57] ABSTRACT

An automotive power control system which delivers a regulated voltage to a load circuit during normal operation and which delivers maximum power when the demand exceeds the alternator's ability to supply adequate current to the load. A duty-cycle-controlled DC-to-DC voltage converter reduces the alternator voltage to a level appropriate for charging the system battery and supplying low voltage loads. When the rotational speed of the alternator is adequate to generate sufficient load current, the voltage converter operates under the control of a first feedback circuit which compares the converter's output load voltage with a reference potential to generate an error signal which regulates the output voltage to a desired level. When the output voltage falls below that desired level, a speed signal indicative of the speed at which the alternator is rotating is used to generate a control signal which is applied to the switching converter to vary the alternator output voltage and maximize the power obtained from the alternator at the sensed rotational speed.

10 Claims, 2 Drawing Sheets

CONTROL SYSTEM FOR A VEHICLE ELECTRICAL SYSTEM

This application is a continuation of application Ser. No. 07/960,629, filed Oct. 14, 1992, now abandoned.

FIELD OF THE INVENTION

This invention relates generally to automotive electrical systems and more particularly, although in its broader aspects not exclusively, to an arrangement for optimizing and regulating the power delivered by an automotive alternator system.

BACKGROUND OF THE INVENTION

Modern automotive electrical systems typically include an alternator which is rotated by the vehicle's engine to generate an electrical voltage for charging the vehicle's battery and for operating the numerous electrical loads which are powered by battery voltage.

A voltage regulation system is used to control the output power delivered by the alternator system. Since the voltage generated by the rotating alternator armature can be controlled to some extent by varying the amount of current delivered to the alternator's field windings, a first voltage regulating mechanism is typically used to reduce the alternator field current whenever the generated output voltage exceeds a predetermined level. As long as the alternator output voltage is below that predetermined level, this first regulating mechanism maintains the field current at a predetermined level equivalent to the maximum field current which the alternator can safely handle.

The alternator preferably delivers an output voltage substantially above the battery's terminal voltage. Devices which can be more efficiently powered at higher voltages, such as blower motors and windshield heating elements, may be powered directly from the higher voltage produced by the alternator, while the low voltage devices are powered by a more precisely regulated voltage produced by the switching converter having an output voltage which is regulated to a level appropriate for charging the vehicle's battery.

The switching converter adjusts its output voltage to the desired level by varying the switching times or "duty cycle" of the transistors which control the flow of current to the load. A regulating feedback circuit responds to any deviation in the output voltage from a preset reference level by producing an error signal which alters the duty cycle to maintain the desired output voltage. U.S. Pat. No. 4,694,238 issued on Sep. 7, 1987 to Peter Norton discloses such an electrical supply system in which a first regulator controls the alternator field current and a second varies the switching duty cycle of a solid-state switching converter to maintain desired power output voltages.

If the demands of the connected load circuit exceed the output capabilities of the regulated alternator system, the desired output voltage cannot be maintained. Under certain conditions, increasing the converter's duty cycle in a futile attempt to increase its output voltage actually reduces the alternator's ability to deliver power to the vehicle's electrical system.

SUMMARY OF THE INVENTION

It is a first object of the present invention to maximize the amount of power delivered by rotating energy generator under high load conditions. In accordance with a principal feature of the invention, a voltage converter, such as a duty-cycle controlled switching converter, supplies power to the load from the generator and is controlled in response to variations in the measured rotational speed of the generator and load demand to maximize the power delivered by the generator.

In a preferred embodiment of the invention, a switching converter is connected between an alternator and a low voltage load and delivers an output voltage to the load which is reduced from the voltage level generated by the alternator by a factor which is controlled by the switching duty cycle of the switching converter. In accordance with the invention, this duty cycle is varied in response to two control signals, the first of which alters the duty cycle whenever the converter's output voltage exceeds a predetermined reference level, and second of which adjusts the duty cycle as a function of the rotational speed of the alternator whenever the output voltage applied to the load falls below that reference level. As contemplated by the invention, the second control signal varies as a predetermined function of rotational speed according to a predefined relationship adapted to maximize the power generated by the alternator rather than simply maximizing the voltage delivered. In this way, more needed power is delivered to the connected load under those combinations of low alternator rotational speed and/or high demand conditions which exceed the alternator's ability to provide the desired output voltage level.

BRIEF DESCRIPTION OF THE DRAWINGS

These and other objects, features and advantages of the invention may be more clearly understood by considering the following detailed description. In the course of this description, reference will frequently be made to the attached drawings, in which.

DETAILED DESCRIPTION

Figure 1:
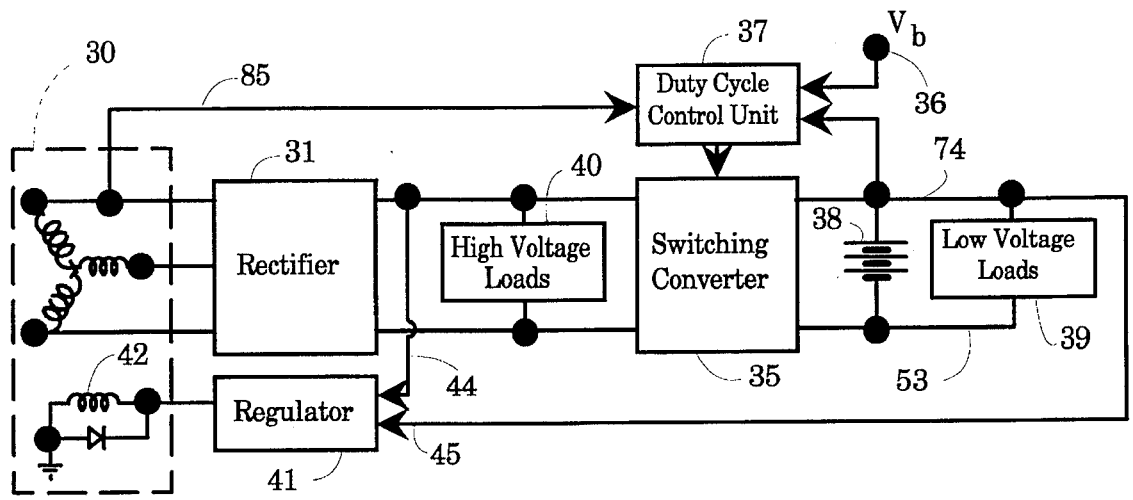
FIG. 1 is a schematic block diagram of an automotive electrical system which embodies the invention.

FIG. 1 of the drawings shows an electrical system for a motor vehicles which embodies the principles of the invention. A three phase alternator 30 supplies power at a variable voltage through a rectifier 31 to a DC to DC switching converter 35 which converts the voltage generated by the alternator to a lower output voltage. The voltage delivered by the switching converter 35 is normally regulated to a level determined by a reference voltage $V_b$ applied to terminal 36, the regulation being achieved by the operation of a duty cycle control circuit seen at 37 in FIG. 1. The voltage level $V_b$ is selected to produce a converter output voltage suitable for charging a battery 38 and supplying low voltage loads illustrated as a group at 39. The higher voltage appearing at the output of rectifier 31 can be advantageously supplied to certain high voltage loads, indicated at 40, such as heated windshields and electrical heaters which supplement conventional heaters.

The regulator 41 is conventional and operates to reduce the average current supplied to the alternator field coil 42 whenever the alternator output voltage supplied via conductor 44 or the converter output voltage supplied via conductor 45 exceed predefined maximum voltages. When these two output voltages are below these maximum levels, the regulator maintains the current through the field winding 41 at a predetermined maximum safe operating level. Accordingly, under the low output voltage conditions that are the focus of the present invention, the regulator 41 attempts to maintain the alternator field current at its predetermined maximum safe operating level.

Figure 2:
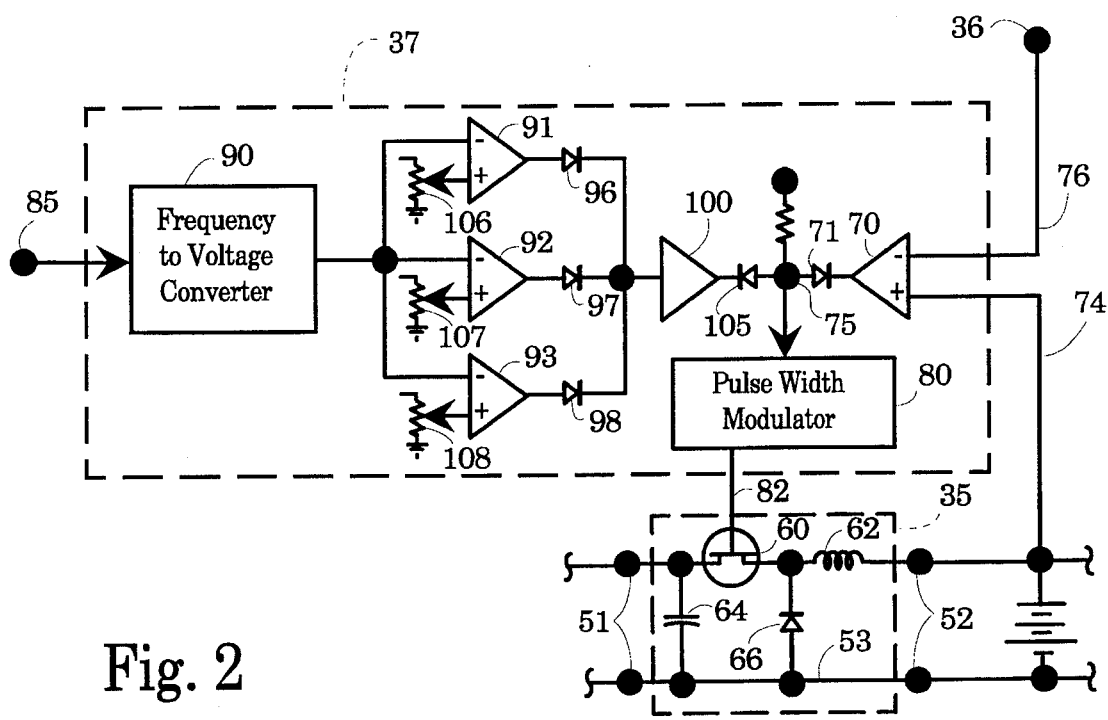
FIG. 2 is a more detailed schematic diagram of the duty cycle control circuit and the switching converter employed in the preferred embodiment of the invention.

The switching converter 35 preferably takes the form of the buck converter shown in more detail in FIG. 2. As seen in FIG. 2, the converter 35 reduces the voltage applied at its high-voltage input terminals 51 to a lower, regulated voltage which is produced across the low-voltage output terminals 52. One of the input terminals 51 is connected to one of the output terminals 52 over a common return path 53 while the upper input terminal 51 seen in FIG. 2 is connected to the upper output terminal 52 by the series combination of a switching transistor 60 and smoothing inductor 62. A filter capacitor 64 is connected across the input terminals 51 and a flyback diode 66 connects the junction of the transistor 60 and the inductor 62 to the common return path 53.

Switching transistor 60 is turned ON and OFF by a duty cycle control signal generated by the duty cycle control unit 37 to be described. Whenever transistor 60 is turned ON, the flyback diode 66 is reverse biased, and current flows through the inductor 62 and output terminals 52. When the transistor 60 turns OFF, current continues to flow in the same direction through the smoothing inductor 62, but now flows through the now forward-biased flyback diode 66.

The switching converter 35 reduces the voltage applied from the input terminals 51 to a lower level appearing at the output terminals 52, the ratio of output to input voltage being directly related to the duty cycle of the transistor switch 60, that is to the percentage of time the transistor 60 is conducting rather than non-conducting. This duty cycle is established by the duty cycle control unit 37 which is shown in detail in FIG. 2.

One function of the duty cycle control unit 37 is to control the output voltage applied across terminals 52 to a predetermined level appropriate for charging the battery 38 seen in FIG. 1. That objective is accomplished by the differential amplifier 70 which delivers a first control signal via a diode 71 to terminal 75 whenever the switching converter's output voltage, supplied via conductor 74 to one input of the amplifier 70, exceeds a reference voltage $V_b$ applied to the other input of amplifier 70 via conductor 76.

Terminal 75 is the control input to a pulse width modulator 80 of conventional design which generates a train of alternating turn-ON and turn-OFF pulses which are applied to the control electrode of the switch 60 via modulator output conductor 82. Whenever the output voltage across converter output terminals 52 exceeds the reference level $V_b$, an amplified error signal is produced at the output of amplifier 70 which forward biases diode 71 low and applies a low signal to the input of the pulse width modulator 80 which decreases the duty cycle (i.e., the ratio of ON-time to OFF-time) of the switching transistor 60. This voltage-regulating feedback path via differential amplifier 70 effectively prevents the voltage applied to output terminals 52 from exceeding the limit established by the reference voltage $V_b$.

Another function of the duty cycle control unit 37 becomes effective when the output voltage at terminals 52 is at or below the reference level $V_b$. In that condition, the signal applied to terminal 75 is adjusted to increase the duty cycle of the switch 60, thus maintaining the converter output voltage within regulation.

Figure 3:
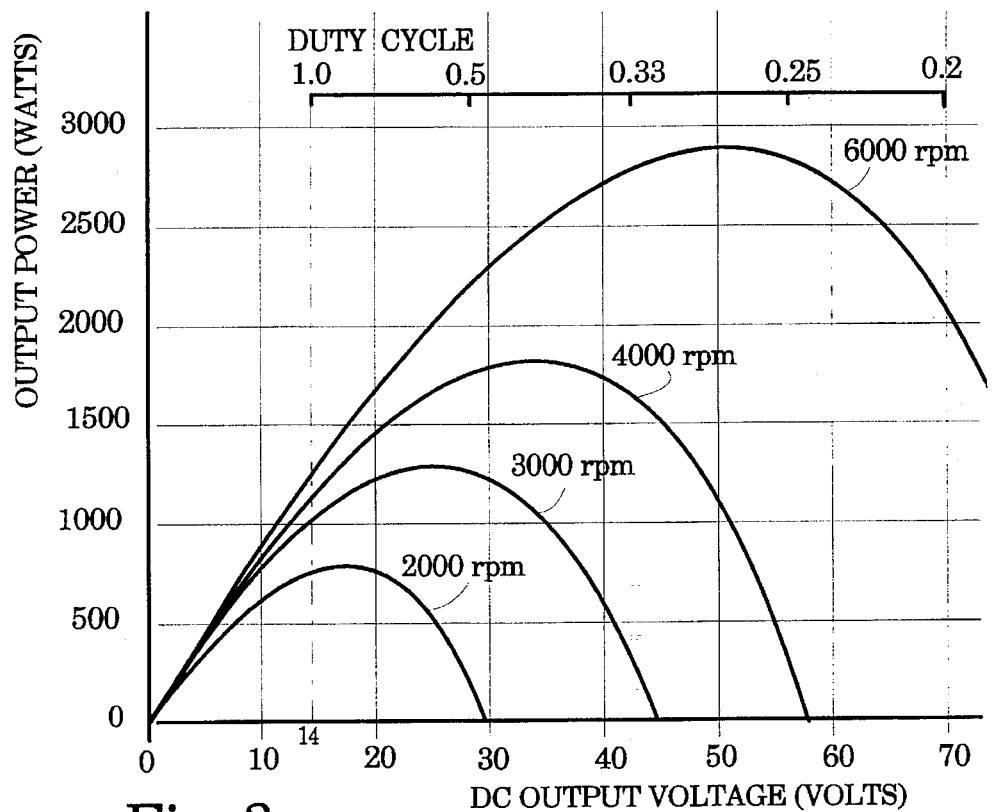
FIG. 3 is a graph depicting the electrical operating characteristics of the unregulated alternator system.

The curved lines in FIG. 3 illustrate the power vs. output voltage characteristics of a typical automotive alternator at four different rotational speeds: 2, 3, 4 and 6 thousand revolutions per minute. For all four curves, the armature field current is maintained at its maximum safe operating level (by means of the regulator 41 seen in FIG. 1). As seen in FIG. 3, the illustrated alternator rotating at 4,000 rpm generates its maximum power output when its output voltage is approximately 35 volts. Also, as FIG. 3 illustrates, the alternator output voltage at which the maximum output power is achieved increases as the rotational speed of the alternator increases.

A duty cycle reference line appears at the top of FIG. 3 and shows the relationship between the duty cycle of the converter needed to establish a nominal output voltage of 14 volts. This is plotted in FIG. 3 against the alternator output voltage along the abscissa. Thus, a duty cycle of 1 (continuous ON-time) implies that the alternator output voltage is equal to the switching converter output voltage, whereas a duty cycle of 0.5 (equal ON and OFF times) implies that alternator output voltage is 28 volts (twice the nominal 14 volt converter output voltage).

Figure 4:
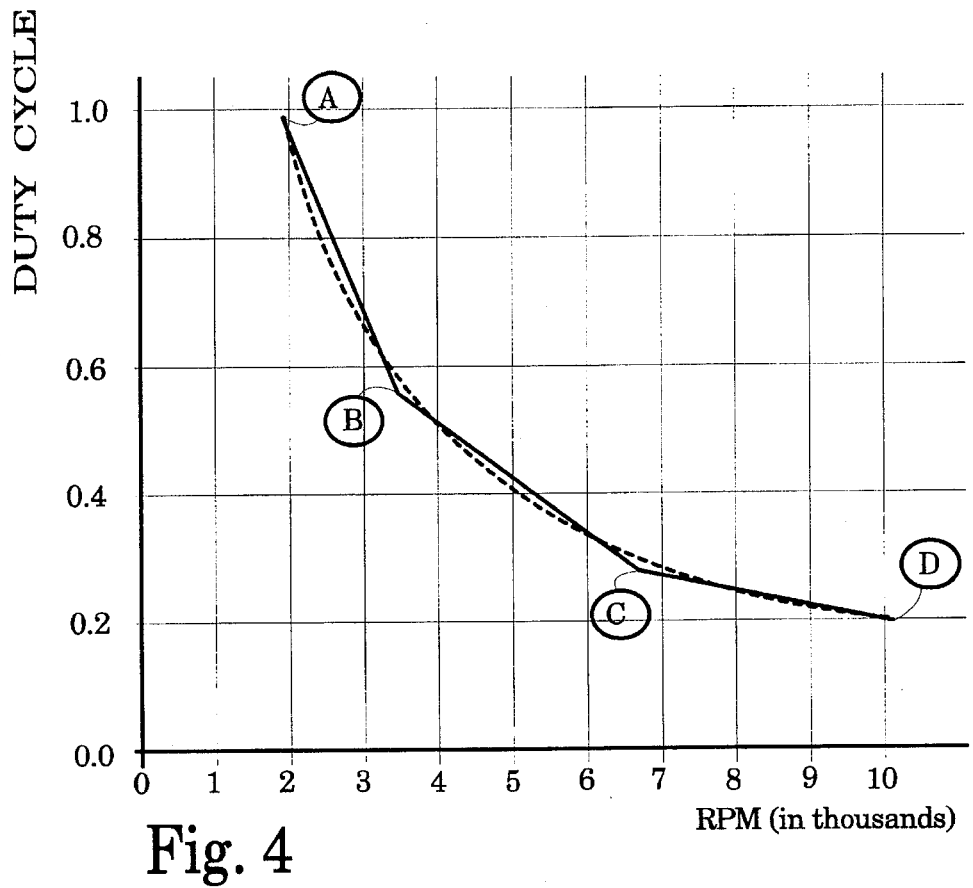
FIG. 4 is a graph showing the manner in which the duty cycle of the switching converter is in response to the alternator's rotational speed in order to maximize output power when the alternator system is unable to supply the desired output voltage.

The curved, dashed line of FIG. 4, which is derived from the alternator's physical characteristics as plotted in FIG. 3, indicates the manner in which the duty cycle should vary with changing speed to obtain the maximum power output from the alternator. As contemplated by the invention, this optimum relationship between alternator speed and duty cycle is used to limit the maximum switching times of the converter 35 whenever the alternator is unable to supply sufficient power to achieve the desired output voltage level $V_b$.

The desired functional relationship between rotational speed and duty cycle timing is implemented by a linear approximation circuit within the duty cycle control unit 37. As seen in FIGS. 1 and 2, conductor 85 supplies a sample of the AC waveform from the alternator 30 to the duty cycle control unit 37. A frequency-to-voltage conversion device 90 supplies a DC signal to the inputs of three differential amplifiers 91, 92 and 93 whose outputs are connected via diodes 96, 97 and 98 respectively to the input of a buffer amplifier 100. The output of amplifier 100 is connected through a diode 105 the input terminal 75 of the pulse width modulator 80.

A second input to each of the differential amplifiers 91, 92 and 93 is connected to a reference potential supplied via adjustable potentiometers 106, 107 and 108 respectively as seen in FIG. 2. The potentiometers 106, 107 and 108 are adjusted such that the outputs of the connected amplifiers go positive to deliver an output through the connected diodes at different input voltage levels in order to generate a voltage at the output of amplifier 100 which varies with changing armature speed as illustrated to achieve a 3-part linear approximation of the desired duty cycle vs. speed relationship seen in the graph of FIG. 4. Thus, at rotational speeds below about 3,500 rpm (point B on the graph of FIG. 4) but above about 1,800 rpm (point A in FIG. 4), the maximum achievable power (approximately) is obtained from the alternator by limiting the duty cycle to change with speed along the line joining points A and B. In this range, the output voltage from frequency to voltage converter 90 is sufficiently high to drive the output of amplifier 91 high enough that diode 96 conducts, but not sufficiently high to activate the amplifiers 92 and 93. At point B, diode 97 conducts and the gain of the circuit is then dictated by the amplifier 92 so that the circuit provides the duty cycle vs. frequency indicated by the line segment B-C seen in FIG. 4.

Finally, as the rotational speed of the alternator increases beyond about 6,700 rpm, the duty cycle increases along the line segment joining points C and D to continue to approximate the optimal characteristic indicated by the dashed line in FIG. 4.

It is to be understood that the specific arrangement which has been described is merely illustrative of one application of the principles of the invention. Numerous modifications may be made by those skilled in the art without departing from the true spirit and scope of the invention.

What is claimed is:

1. A control system for controlling the magnitude of output power delivered to a load circuit from a rotating electrical energy generator, said control system comprising, in combination, means responsive to said generator for generating a speed signal indicative of the rotational speed of said generator, a voltage converter having a power input connected to receive energy from said generator a power output connected to deliver an output voltage to said load circuit, and a control input, the magnitude of said output voltage being determined by the magnitude of a control voltage applied to said control input, and circuit means responsive to said speed signal for applying said control voltage to said control input to produce an output voltage at said power output such that said output voltage is a predetermined function of rotational speed of said generator, said predetermined function being adapted to continuously vary said output voltage as said rotational speed changes to produce the maximum power from said generator.

2. The control system set forth in claim 1 wherein said means for generating a speed signal comprises a frequency to voltage converter having an input connected to the output of said generator for converting a time varying component of the electrical energy produced by said generator into a direct current voltage whose magnitude is directly related to the rotational speed of said generator.

3. The combination set forth in claim 2 wherein said circuit means for applying said control voltage comprises, in combination, an amplifying circuit having an input connected to receive said speed signal and an output circuit for producing said control signal, the instantaneous gain of said amplifying circuit being dependent upon the instantaneous magnitude of said speed signal.

4. In combination, a rotating electrical power generator for producing generated power at a generated voltage, a load circuit, a voltage converter comprising, in combination,
   an input for receiving a control signal,
   a power input connected to receive said generated voltage,
   a power output connected to supply a load voltage to said load circuit, and
   means responsive to the magnitude of said control signal for varying the relative magnitudes of generated voltage and said load voltage, drive means for rotating said generator at a variable rotational speed, means for producing a speed signal indicative of the rotational speed of said generator, and means responsive to said speed signal for varying said magnitude of said control signal to continuously vary the magnitude of said generated voltage for a given load voltage to maximize the amount of said generated power produced by said rotating generator.

5. The combination set forth in claim 4 wherein said means for producing a speed signal comprises a frequency to voltage converter having an input connected to the output of said generator for converting a time varying component of said generated power into a direct current voltage whose magnitude is directly related to the rotational speed of said generator.

6. The combination set forth in claim 5 wherein said means for varying said control signal comprises, in combination, an amplifying circuit having an input connected to receive said speed signal and an output circuit for producing said control signal, the instantaneous gain of said amplifying circuit being dependent upon the instantaneous magnitude of said speed signal.

7. A vehicle electrical system comprising:

a rotating electrical power generator for producing generated power at a generated voltage, a load circuit, a voltage converter comprising, in combination,
   an input for receiving a duty cycle control signal,
   a power input connected to receive said generated voltage,
   a power output connected to supply a load voltage to said load circuit, and
   means responsive to the magnitude of said duty cycle control signal for varying the relative magnitudes of generated voltage and said load voltage, drive means for rotating said generator at a variable rotational speed, means for producing a speed signal indicative of the rotational speed of said generator, and a duty cycle control unit comprising
   first means responsive to said power output for limiting said generated voltage to a reference voltage, and
   second means responsive to said speed signal for varying said magnitude of said control signal to continuously vary the magnitude of said generated voltage whenever said generated voltage is below said reference voltage to maximize the amount of said generated power produced by said rotating generator.

8. The vehicle electrical system set forth in claim 7 wherein the second means comprises, in combination, an amplifying circuit having an input connected to receive said speed signal and an output circuit for producing said duty cycle control signal, the instantaneous gain of said amplifying circuit being dependent upon the instantaneous magnitude of said speed signal.

9. The vehicle electrical system set forth in claim 8 wherein the second means further comprises a frequency-to-voltage converter responsive to said speed signal for producing a voltage proportional in magnitude to said speed signal.

10. The vehicle electrical system set forth in claim 9 wherein the amplifying circuit comprises a plurality of differential amplifiers, each responsive to a different range of voltages produced by said frequency-to-voltage converter to produce said instantaneous gain of said amplifier.

* * * * *